(12) United States Patent
Peng et al.

(10) Patent No.: US 6,610,146 B1
(45) Date of Patent: Aug. 26, 2003

(54) EASY THREADING WIRECOATING DIES

(75) Inventors: Hong Peng, Pickerington, OH (US); James Laurence Thomason, Newark, OH (US); Thomas Scot Miller, Granville, OH (US)

(73) Assignee: Owens-Corning Fiberglas Technology, Inc., Summit, IL (US)

( * ) Notice: Subject to any disclaimer, the term of this patent is extended or adjusted under 35 U.S.C. 154(b) by 143 days.

(21) Appl. No.: 09/669,626

(22) Filed: Sep. 25, 2000

(51) Int. Cl.[7] .............................................. B05C 11/02
(52) U.S. Cl. .............................. 118/125; 118/DIG. 18; 118/420
(58) Field of Search ................................ 118/125, 420, 118/DIG. 18, 405; 425/113, 190, 188

(56) References Cited

U.S. PATENT DOCUMENTS

| | | |
|---|---|---|
| 2,280,415 A | 4/1942 | Larmuth |
| 2,407,337 A | 9/1946 | Kolter |
| 3,898,953 A | 8/1975 | Couture |
| 3,922,128 A | 11/1975 | Solomon |
| 3,944,459 A | 3/1976 | Skobel |
| 4,194,462 A | 3/1980 | Knowles |
| 4,409,263 A | 10/1983 | Aloisio, Jr. et al. |
| 4,410,561 A | 10/1983 | Hart, Jr. |
| 4,419,958 A | 12/1983 | Roba |
| 4,510,884 A | 4/1985 | Rosebrooks |
| 4,521,363 A | 6/1985 | Vogel |
| 4,531,959 A | 7/1985 | Kar et al. |
| 4,583,485 A | 4/1986 | Smith, Jr. |

(List continued on next page.)

FOREIGN PATENT DOCUMENTS

| | | |
|---|---|---|
| EP | 0 380 207 A1 | 8/1990 |
| EP | 0744637 | * 11/1996 |
| WO | WO 01/46080 A2 | 6/2001 |

*Primary Examiner*—Brenda A. Lamb
(74) *Attorney, Agent, or Firm*—Inger H. Eckert; Stephen W. Barns; Maria C. Gasaway (57) ABSTRACT

Dies which facilitate the threading of a strand are disclosed. Each die embodiment includes portions that move relative to each other to allow access to the area between the portions. One embodiment of a die embodying the principles of the invention includes an upper portion and a lower portion. Each die portion includes components corresponding to substantially half of a wirecoating die. Accordingly, when the die portions are adjacent each other, they form a complete wirecoating die. In the preferred embodiment, the upper portion is moveable relative to the lower portion, which is fixed. Each portion is coupled to a support by a conduit through which resin can be supplied to the particular die portion. The upper portion is pivotally mounted to the support for movement between an upper position in which the die is open and a lower position in which the die is closed. This die is used in an in-line wirecoating process in which a strand is wirecoated downstream from a bushing during a fiber forming process. Another embodiment of a die embodying the principles of the invention is a sealable-slot die. This die embodiment includes a body and a nozzle disposed in the body. The nozzle and the die body have slots which are in fluidic communication with the exterior of the die. The slots are sized to permit a strand to be thread through them and into the interior of the nozzle. A plate with an extension is placed on the die so that the extension seals the slots after a strand is thread in the die. This die is typically used in a low pressure system, such as a string binder wirecoating process.

11 Claims, 11 Drawing Sheets

U.S. PATENT DOCUMENTS

| | | |
|---|---|---|
| 4,662,307 A | 5/1987 | Amos et al. |
| 4,688,515 A | 8/1987 | Rosebrooks |
| 4,778,367 A | 10/1988 | Hilakos |
| 4,937,028 A | 6/1990 | Glemet et al. |
| 5,151,147 A | 9/1992 | Foster et al. |
| 5,571,326 A * | 11/1996 | Boissonnat et al. ......... 118/405 |
| 5,601,775 A | 2/1997 | Cunningham et al. |
| 5,688,457 A | 11/1997 | Buckmaster et al. |
| 5,702,527 A | 12/1997 | Seaver et al. |
| 5,716,574 A | 2/1998 | Kawasaki |
| 5,830,391 A | 11/1998 | Lamkemeyer et al. |
| 5,972,503 A | 10/1999 | Woodside |

* cited by examiner

EASY THREADING WIRECOATING DIES

TECHNICAL FIELD AND INDUSTRIAL APPLICABILITY OF THE INVENTION

This invention relates to a die for wirecoating a continuous strand. More particularly, the present invention relates to a die with portions that are movable with respect to each other to facilitate the threading of a strand in the die. The invention also relates to a method of manufacturing a wirecoated strand using the die. The invention is particularly useful in the production of wirecoated strands, which may be utilized in a subsequent process, such as the production of molded plastic articles.

BACKGROUND OF THE INVENTION

A continuous strand can be covered with a sheath of material, which is referred to as wirecoating the strand. A strand can be wirecoated for several reasons, including to protect the strand from external elements, to strengthen the strand, and to provide a particular material on the strand for subsequent processing. A wirecoated strand may be chopped into pellets for use in a subsequent molding process.

Wirecoating involves the application of a sheath of resin on the outer surface of a strand as it passes through a die. Strands are typically wirecoated using a die which supplies the sheath of resin circumferentially about the strand. A continuous strand is attenuated through the die. The pressure coating of strands eliminates gaps or voids in the coating. When the strand breaks, the wirecoating process is interrupted and the strand must be rethread in the die.

Some conventional dies are unitary piece dies with a central aperture through which the strand is threaded. When the strand breaks, it is difficult to rethread the strand into the die and draw the strand out the outlet of the die to continue the operation.

Some coating assemblies include die halves that move relative to each other. Examples of such coating assemblies are disclosed in U.S. Pat. No. 4,419,958 to Roba and U.S. Pat. No. 4,688,515 to Rosebrooks.

Roba discloses a nozzle for the application of a protective resin to an optical fiber. The nozzle includes blocks A and B that are slidably interconnected by a set of four guide rods F1–F4 surrounded by respective coil springs 10 that are partly received in recesses 11 formed in the confronting block faces. A yoke 12 has a pair of legs C, D whose extremities are received in lateral notches of block A, to which they are secured by screws 14, and which engage in similar notches 15 of block B. A screw E is threaded into a neck 16 of yoke 12 and has a captive end retained in block B so that its rotation causes the blocks to approach each other against the resistance of springs 10. The nozzle body is produced by sliding the two aluminum blocks together. The arrangement relies on the operation of the springs 10 to separate the nozzle blocks.

Rosebrooks discloses a split coating head assembly for coating elongated strands. The head assembly includes mounting blocks 2, 32 that are movable together about an optical fiber. The mounting blocks 2, 32 are mounted opposite to each other on a platen 20. The platen 20 includes a screw 50 in a block 52 for retaining the mounting blocks 2, 32 in a tightly abutting relationship. The screw 50 is adapted to impinge upon the second mounting block 32, which is movable. When the mounting blocks are moved together, protrusions 24 on the first block enter bores 44 on the second block to accurately align the two half-die sets. The mounting blocks 2, 32 slide together around the fiber.

A need exists for an economical way to manufacture a wirecoated strand. Similarly, a need exists for a die in which a strand may be easily rethread to reduce the down time in the wirecoating process.

SUMMARY OF THE INVENTION

The shortcomings of the prior art are overcome by the disclosed dies which facilitate the threading of a strand in the dies. Each die embodiment includes portions that move relative to each other to allow access to the area between the portions.

One embodiment of a die embodying the principles of the invention includes an upper portion and a lower portion. Each die portion includes components corresponding to substantially half of a wirecoating die. Accordingly, when the die portions are adjacent each other, they form a complete wirecoating die. In the preferred embodiment, the upper portion is moveable relative to the lower portion, which is fixed.

Each portion is coupled to a support by a conduit through which resin can be supplied to the particular die portion. The upper portion is pivotally mounted to the support for movement between an upper position in which the die is open and a lower position in which the die is closed.

This die is used in an in-line wirecoating process in which a strand is wirecoated downstream from a bushing during a fiber forming process.

Another embodiment of a die embodying the principles of the invention is a sealable-slot die. This die embodiment includes a body and a nozzle disposed in the body. The nozzle and the die body have slots which are in fluidic communication with the exterior of the die. The slots are sized to permit a strand to be thread through them and into the interior of the nozzle.

A plate with an extension is placed on the die so that the extension seals the slots after a strand is thread in the die. This die is typically used in a low pressure system, such as a string binder wirecoating process.

DETAILED DESCRIPTION AND PREFERRED EMBODIMENTS OF THE INVENTION

The present invention is directed to wirecoating dies that facilitate the threading of a continuous strand and to the methods of manufacturing a wirecoated strand using the dies. Continuous strands may be coated with a thermoplastic or resinous material for numerous applications. For example, the strands may be coated for use in a polymer-glass compounding process. The terms "strands," "threads," and "filaments" may be used interchangeably to designate a continuous element comprising multiple filaments.

During a wirecoating process, a strand is attenuated through a die in which a thin coating of molten material is applied to the strand. The strand is typically evenly coated with the material around its circumference. Strands are attenuated through different wirecoating dies at different linear speeds depending on the particular application.

Strands in a variety of combinations of off-line and on-line process can be wirecoated. A strand may be supplied to a wirecoating die in an off-line form or an on-line form. An example of an on-line form is a strand directly from a bushing. An example of an off-line form is a strand that has been previously collected in a wound package or bulk form.

Similarly, the wirecoated strand may be processed on-line or off-line. An example of an on-line process is a chopper which chops the wirecoated strand into discrete pellets. An example of an off-line process is a winder or an attenuator and container assembly for collecting the wirecoated strand for subsequent processing.

As the artisan will appreciate, a strand in either on-line form or off-line form can be wirecoated and subsequently handled in either an off-line process or an on-line process.

One example of an off-line form, off-line process system is a string binder process in which a low pressure die system is used. In such a process, the strand is attenuated at a high speed. A low pressure process involves wirecoating a strand with a thermoset resin, such as a polyester thermoset or epoxy. One example of an on-line form, on-line process system is an in-line wirecoating process which coats the strand right after the strand is formed from a bushing. The in-line process uses a high pressure coating system.

The dies embodying the principles of the invention are easy to thread, whether prior to the wirecoating process or after a break in the process. Each die has parts that move relative to each other to permit access to the interior of the die. When the parts are in an open position, a strand may be positioned or thread into the die. The parts are subsequently closed and the die is sealed. A resinous material is supplied to the die to coat the strand.

The dies include a center channel and an outer channel. The strand is attenuated through the center channel as appreciated by the skilled artisan. The outer channel is arranged to direct the flow of resin in a circumferential pattern around the strand.

The contacting surface of each die portion is sealed to prevent resin from leaking during a wirecoating operation. Independent flows of resin can be supplied to each of the die portions. Separate resin flow adjusters are utilized with each flow of resin to control the flows.

As the molten resin flows through the outer channel, it forms a thin uniform sheath around the strand at the die exit. The flow rate of the resin can be adjusted to vary the thickness of the coating on the strand.

The amount of time that the resin contacts the strand in the die is shortened, thereby reducing the coating resistance and abrasion between the fibers in the strand and the internal surfaces of the die. The reduced resistance and abrasion enables an operator to conduct the wirecoating process at high speeds, thereby increasing the overall output.

Figure 1:
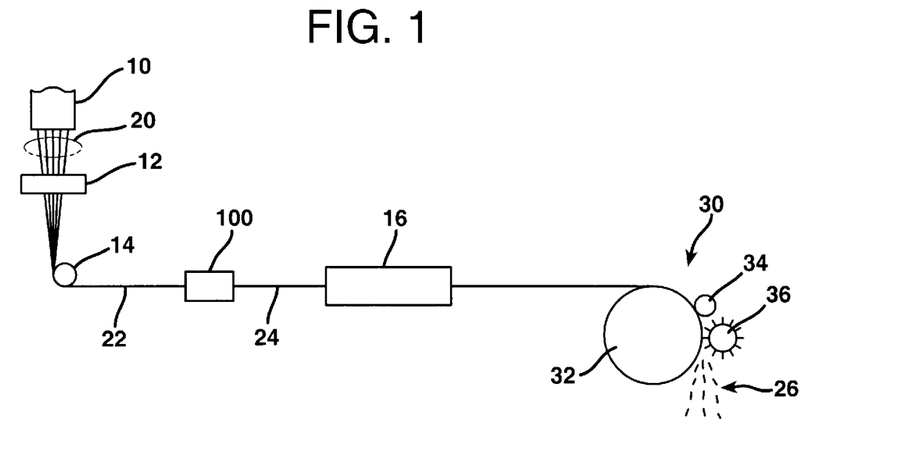
FIG. 1 is a schematic view of an in-line wirecoating process system with a die embodying the principles of the invention.

A conventional wirecoating system is shown in FIG. 1. The wirecoating system illustrates an in-line wirecoating process in which a strand is wirecoated just after it is formed.

A strand 22 of glass filaments 20 is typically formed by attenuating molten glass through a plurality of orifices in a bottom plate of a bushing 10. The fibers or filaments 20 are attenuated by applying tractive forces to the streams of glass, so as to attenuate the glass in streams. The filaments are coated by a size applicator 12 with a size or binder material that serves to provide a lubricating quality to the individual filaments to provide them with abrasion resistance. The size or binder material also serves to promote fiber dispersion in and bonding to the resin matrix if the wirecoated strands are to be utilized in a subsequent process, such as the production of molded plastic articles. The size material is applied to the glass filaments 20 substantially immediately after they are formed. The fibers 20 are gathered in parallel relationship by a gathering shoe 14 to form a strand 22.

The strand 22 then passes through a wirecoating die 100. A sheath of coating material is applied to the strand 22 as it passes through the die 100. The coated strand 24 is attenuated through a cooling apparatus 16, such as a water bath, to cool the coating material.

The coated strand 24 may be processed by a pelletizer 30 as shown or rolled onto a mandrel. The pelletizer 30 includes a drive roll 32, a pressure roll 34 that maintains the coated strand in contact with the drive roll, and a cutter 36 with blades that cut the coated strand 24 in discrete segments or pellets 26. The pelletizer 30 starts at a slow speed at which it is pulling the coated strand 24 without chopping it. The operational speed of the pelletizer is increased and the coated strand 24 is chopped into discrete segments. The pellets are used in a secondary process, such as the molding of plastic articles.

Figure 14:
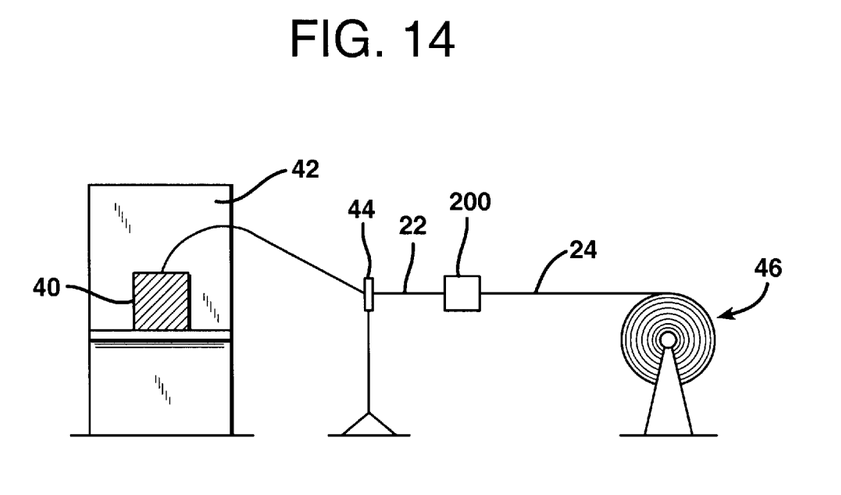
FIG. 14 is a schematic view of a string binder system with a die embodying the principles of the invention.

An alternative wirecoating process in shown in FIG. 14. This process utilizes a system that includes a die embodying the principles of the invention as well. A package 40 of continuous fiberglass roving is placed on a creel 42. The system includes a strand guide 44. One end of the strand 22 of the package 40 is fed through the strand guide 44 to the die 200.

A sheath of coating material is continuously applied to the strand 22 as it passes through the die 200. The coated strand 24 is cooled by an appropriate cooling apparatus (not shown) and subsequently collected by a winder 46.

With these general principles identified, selected implementations of these principles in currently preferred embodiments are set forth below.

Figure 2:
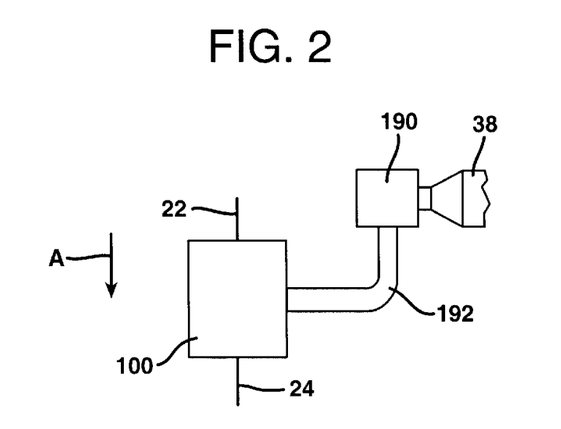
FIG. 2 is a plan view of the die of FIG. 1.
Figure 3:
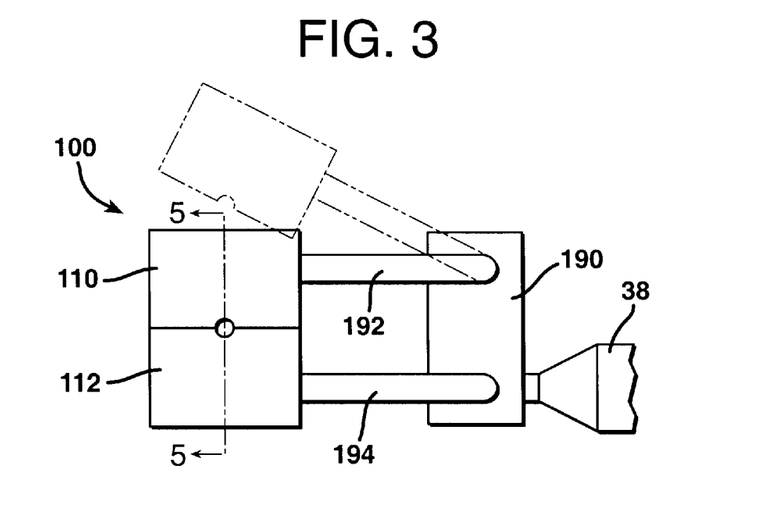
FIG. 3 is a front end view of the die of FIG. 1.

A die for a wirecoating system embodying the principles of the invention is illustrated in FIGS. 2–13. As shown in FIGS. 2–3, the die 100 includes a first portion 110 and a second portion 112 that are coupled to a support 190. The first portion 110 is mounted to an end of a first conduit 192 and the second portion 112 is mounted to an end of a second conduit 194.

Each of the conduits 192, 194 is coupled to the support 190. The first and second conduits 192, 194 are hollow and enable fluidic communication with passages in the support 190 and portions 110, 112, respectively.

The wirecoating system includes an extruder 38 that processes a resinous material, such as resin, into a molten flow. The outlet of the extruder 38 is connected to the support 190 as shown. Accordingly, resin is supplied from the extruder 38 to the die 100 via support 190 and conduits 192, 194.

In the illustrated embodiment, the first conduit 192 is pivotally mounted to the support 190. The conduit 192 is moved relative to the support 190 by a pneumatic or hydraulic actuator (not shown). Preferably, the second conduit 194 is fixed in place relative to the support 190. By moving the first conduit 192 relative to the second conduit 194, the portions 110, 112 are moved between their open and closed positions.

As appreciated by the artisan, the support 190 may include resin flow adjusters (not shown) to control the flow of resin through either or both of the conduits.

Figure 4:
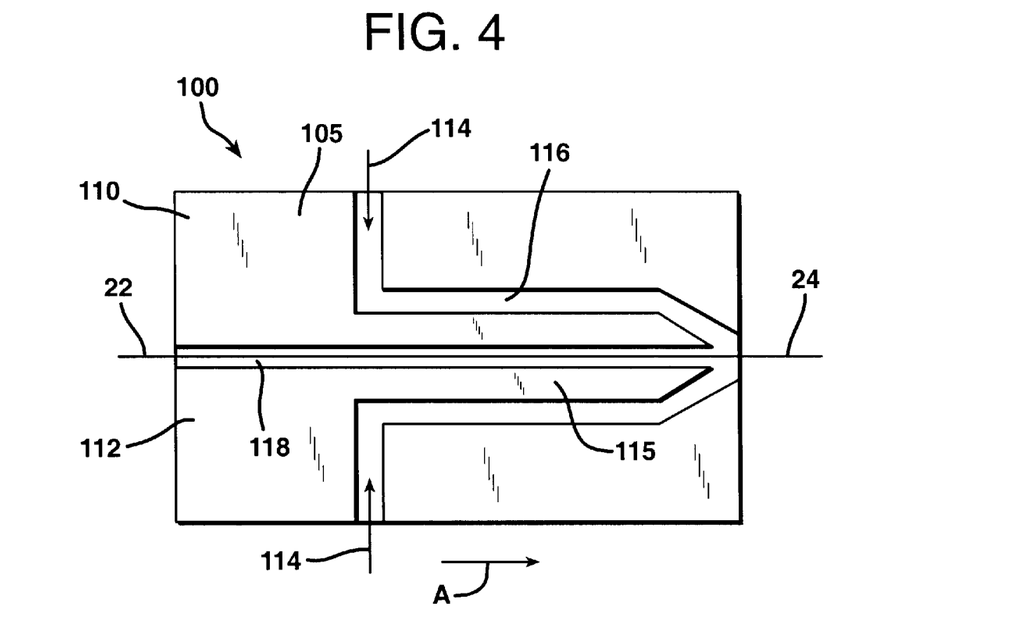
FIG. 4 is a cross-sectional schematic side view of a die embodying the principles of the invention.

The die 100 includes a body 105 with an outer channel 116 and a center channel 118 as shown in FIG. 4. The channels 116, 118 intersect at a downstream end of the die 100. A strand is attenuated through the center channel 118, in the direction of arrow "A."

In the preferred embodiment, the die 100 includes an inner wall or partition 115 which is positioned between the center channel 118 and the outer channel 116. The wall 115 may be moveable relative to the die 100 to enable replacement and/or adjustment of the wall. In the preferred embodiment, the outer channel 116 extends circumferentially around the center channel 118.

The die 100 receives resin supplies 114 from the extruder 38. Each resin supply 114 enters a resin inlet and is directed through the outer channel 116 to the end of the die. The resin forms a sheath around the strand 22 as it is attenuated through the die 100.

Figure 5:
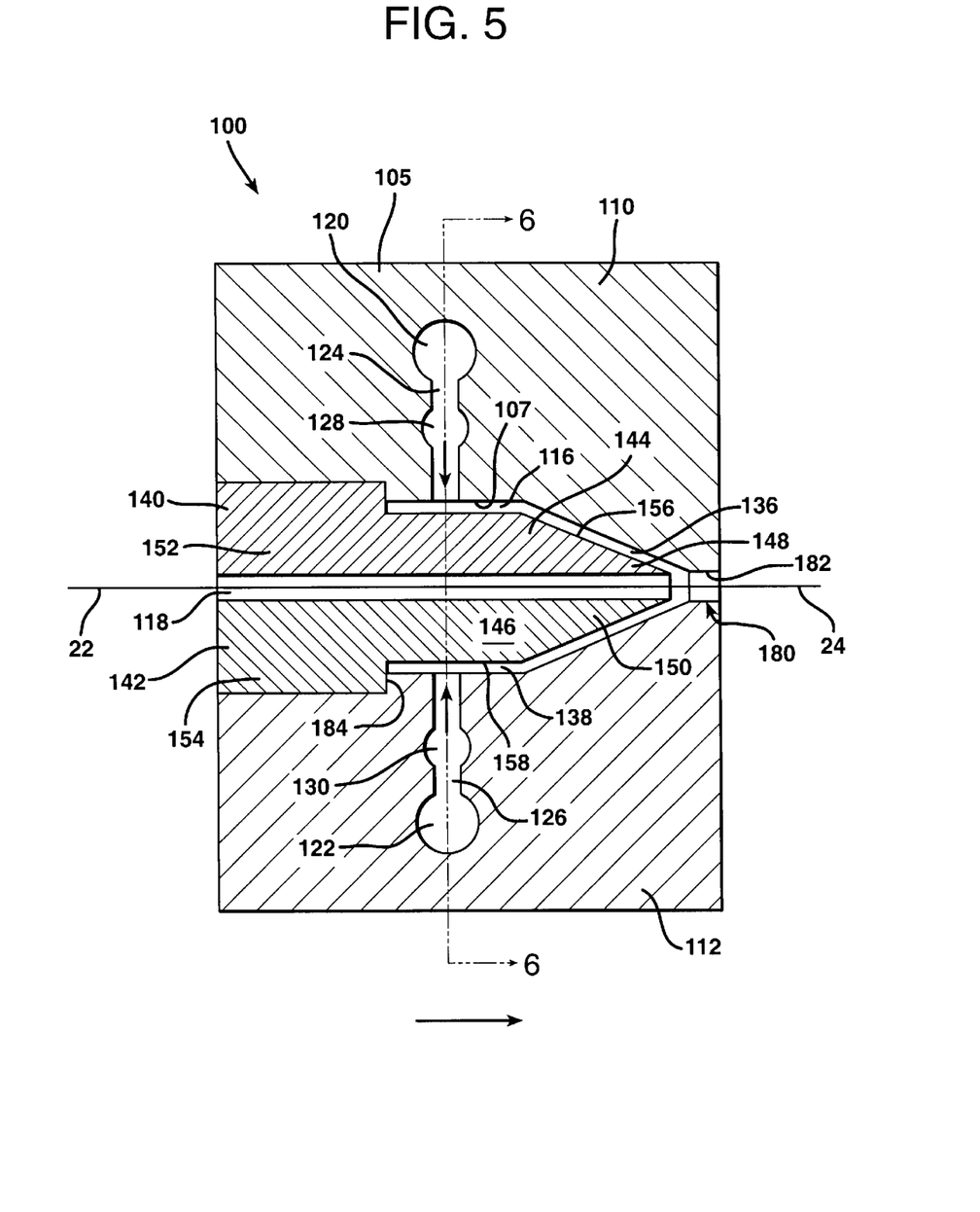
FIG. 5 is a cross-sectional side view of the die of FIG. 3 taken along the lines "5—5".

An exemplary embodiment of a die embodying the principles of the invention is now described with reference to FIG. 5.

In the illustrated embodiment, the die 100 includes a first portion 110 and a second portion 112, which are moveable relative to each other as discussed above. When portions 110 and 112 are positioned adjacent to each other, they form a functioning wirecoating die. Preferably, each portion 110, 112 constitutes half of a die.

Portions 110, 112 have internal cavities or passages 136, 138 that include an outer channel 116. Cavities 136, 138 include inner surfaces and an outlet. In the illustrated embodiment, the body 105 includes a hollow partition or nozzle which separates the outer and center channels 116, 118. Preferably, the nozzle is configured so that corresponding nozzle portions 140, 142 are mounted in first and second portions 110, 112, respectively. The nozzle portions are disposed so that the portions are positioned concentrically within the cavity of the die when portions 110, 112 are adjacent each other.

The center channel 118 is defined by an inner surface of the nozzle portions 140, 142. The outer surfaces 156, 158 of the nozzle portions 140, 142 have a diameter that is slightly less than the diameter of the cavity. The annular space between the nozzle outer surfaces 156, 158 and the cavity inner surfaces defines the outer channel 116.

The resin flows through the outer channel 116 and along the outer surfaces 156, 158 of the nozzles to a coating region 180 adjacent the exit port 182 of the die 100. The resin forms a thin film which coats the strand 22 as it passes through the coating region 180.

The die 100 includes a system for supplying resin from the extruder to the outer channel. The system includes flow chambers 120, 122 and flow ports 124, 126. The flow chambers 120, 122 are in fluidic communication with the outlet of the extruder 38 and the flow ports 124, 126, respectively. Similarly, the flow ports 124, 126 are in communication with cavity 107. Accordingly, the resin supply 114 flows from the extruder 38 through the flow chambers and flow ports into the cavity.

In the illustrated embodiment, the longitudinal axis of the cavity 107 is oriented perpendicularly to the longitudinal axes of the flow chamber 120, 122 and the flow ports 124, 126. However, the artisan will appreciate that the cavity, flow chambers, and flow ports can be oriented in a variety of arrangements.

Figure 6:
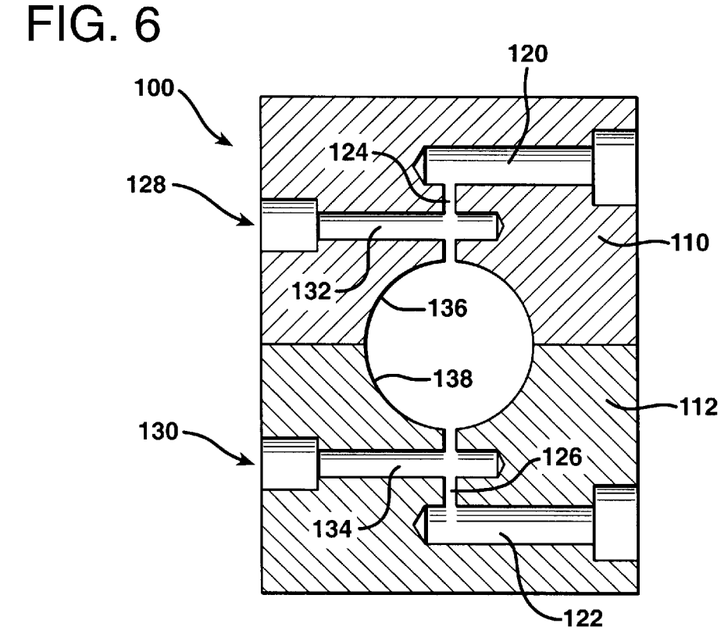
FIG. 6 is a cross-sectional end view of the die of FIG. 5 taken along the lines "6—6".

The die 100 includes resin flow adjusters by which the flows of resin in the die may be controlled independently. The resin flow adjusters 128, 130 control the flows of resin through the flow ports 124, 126. In the illustrated embodiment, each resin flow adjuster includes a cavity formed in the die 100 and an adjustment screw (not shown) mounted in the cavity. The cavities 132, 134 intersect the flow ports 124, 126, and preferably, extend through the flow ports 124, 126 as shown in FIG. 6.

The cavities 132, 134 are threaded to receive adjustment screws. The adjustment screws are rotatably mounted in the cavities. The cavities are oriented to enable the screws to restrict a portion or all of the cross-sectional area of the flow ports. By varying the mount that a screw extends into a flow port, the resin flow through the flow ports is controlled.

Figure 11:
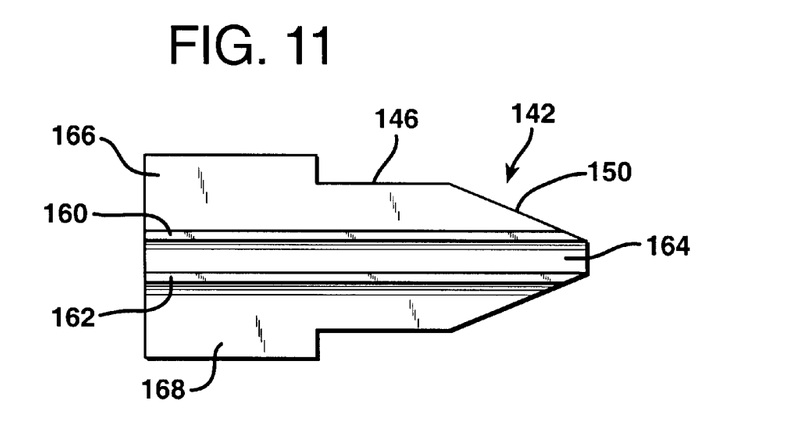
FIG. 11 is a plan view of a nozzle portion embodying the principles of the invention.
Figure 12:
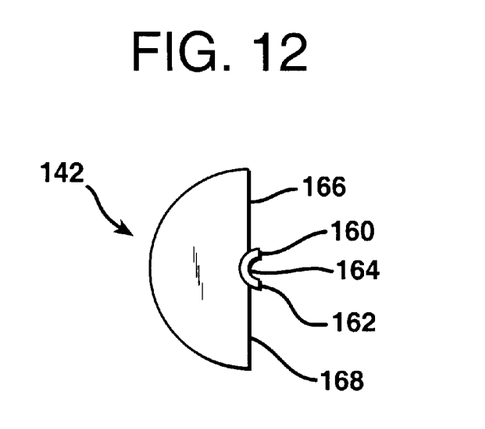
FIG. 12 is an end view of the nozzle portion of FIG. 11.
Figure 13:
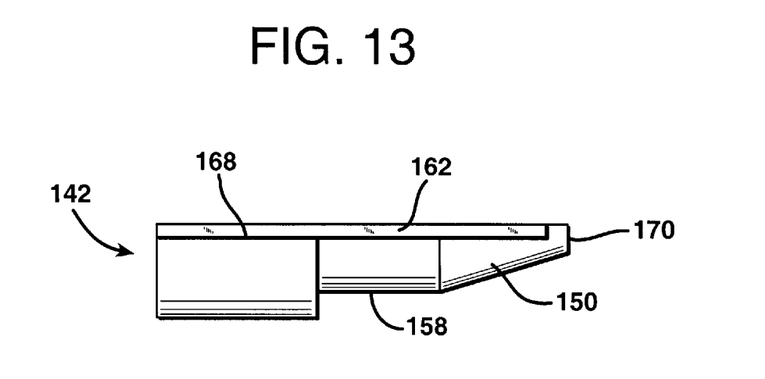
FIG. 13 is a side view of the nozzle portion of FIG. 11.

Turning to a description of the nozzle portions, an exemplary embodiment of a nozzle portion is shown in FIGS. 11–13. Since the upper and lower nozzle portions are identical, only the lower nozzle portion will be discussed in detail to simplify the discussion.

As described above, the nozzle portion 142 includes an inner surface and an outer surface 158. The inner surface defines a portion of a longitudinal channel 164 through which a strand is attenuated. The outer surface 1.58 defines the outer channel 116 for the flow of resin to wirecoat a strand.

The nozzle portion 142 is disposed in the cavity 138 in die portion 112. The cavity 138 includes a substantially cylindrical portion and a tapered portion. The tapered portion directs the resin in the outer channel 116 toward the strand. In the illustrated embodiment, the nozzle portion 142 includes a hemi-cylindrical portion 146 and a first end with a conical tip 150 that has a slope substantially similar to that of the cavity tapered portion.

The nozzle portion 142 also includes a flange 154 at one end. The radius of the flange 154 is larger than the corresponding radius of the cavity 138. Accordingly, the flange 154 engages in a seat 184 formed in the body 105. The extent to which the nozzle portion 142 is inserted into the cavity is limited by the seat.

A pair of shoulders 160, 162 defines a hemi-cylindrical longitudinal channel 164. The channel 164 preferably extends along the length of the nozzle.

The nozzle portion 142 includes recesses 166, 168 positioned on either side of shoulders 160, 162. The function of the recesses 166, 168 is explained in detail below. The recesses extend to a position proximate to end 170.

The die is preferably made from stainless steel or other corrosion and temperature resistant material.

Figure 7:
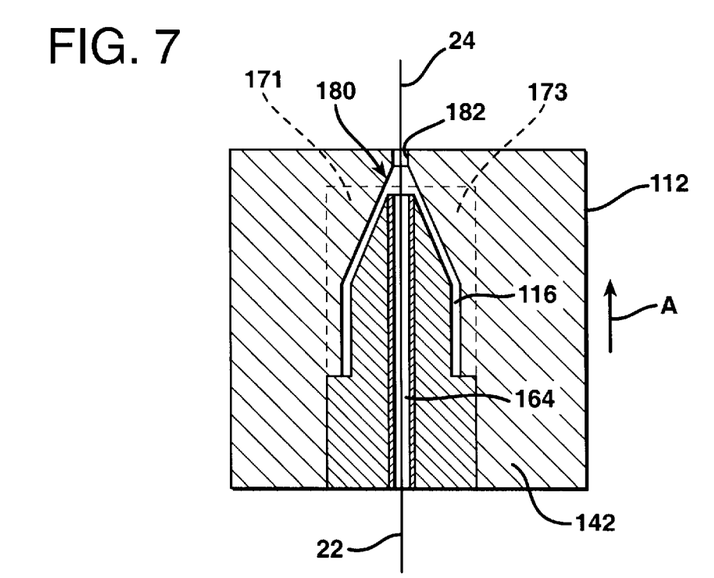
FIG. 7 is a plan view of a lower die portion embodying the principles of the invention.
Figure 8:
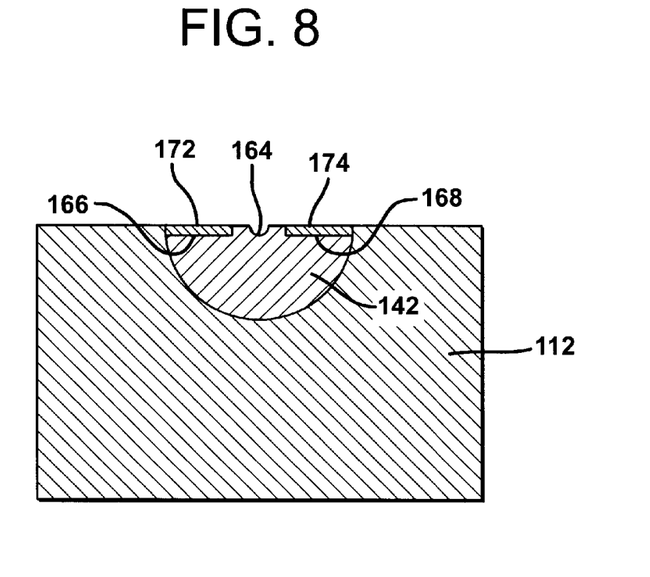
FIG. 8 is an end view of the lower die portion of FIG. 7.
Figure 9:
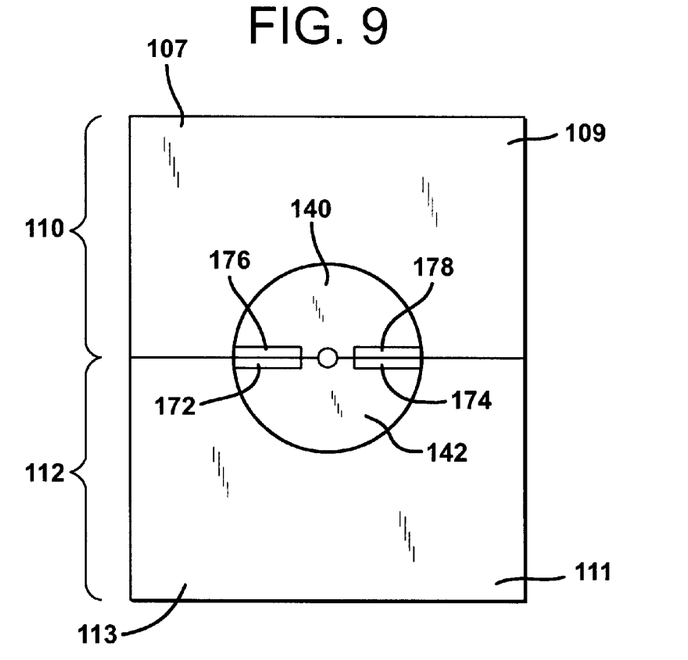
FIG. 9 is an end view of the die of FIG. 1.

A lower die portion embodying the principles of the invention is shown in FIGS. 7–9. The die portion 112 includes a nozzle portion 142 as discussed above. As appreciated by the artisan, the outer channel 116 extends around the lower nozzle portion 142 as shown in FIG. 7. A strand 22 is illustrated in longitudinal channel 164.

Figure 10:
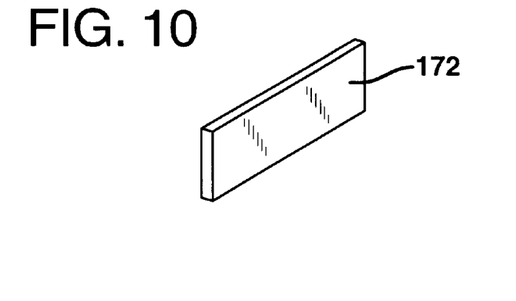
FIG. 10 is a perspective view of a plate embodying the principles of the invention.

Resin in the outer channel 116 may exit the die portions when the upper and lower die portions are separated, unless they are sealed. In the illustrated embodiment, a pair of plates 172, 174 are coupled to the lower die portion 112 to seal the outer channel 116 and prevent resin from exiting the die portion. The plates 176, 178 preferably extend from the upstream end of the die portion to a location proximate the coating region in the die 100. An example of a plate is illustrated in FIG. 10. The positions of the plates are illustrated as 171, 173 in FIG. 7.

In the illustrated embodiment, the plates 172, 174 are sized so that they engage the recesses 166, 168 formed in the lower nozzle portion 142. The plates are coupled to the lower die portion 112 and are substantially level with the upper surface of the lower portion 112 as shown in FIG. 8. This arrangement enhances the sealing of the die when the upper and lower die portions 110, 112 are positioned proximate to each other. Preferably, plates are welded to each die portion as appreciated by the artisan.

The upper and lower die portions 110, 112 are illustrated in a closed position in FIG. 9. The upper die portion 110 is constructed similarly to the lower die portion 112 discussed above.

The upper die portion 110 includes a nozzle portion 140 and plates 176, 178. When the die portions are positioned adjacent to each other, the sealing plates 172, 176 contact each other and the sealing plates 174, 178 contact each other. The upper die portion 110 includes first face 107 and second face 109. Lower die portion 112 includes third face 111 and forth face 113.

Now the operation of the wirecoating system of FIGS. 1–13 is described. Initially, the nozzles are inserted into the die portions and the corresponding plates are welded to the die portions. The two die portions 110, 112 are coupled to conduits 192, 194, which are connected to support 190. The support 190 is fluidically coupled to the outlet of extruder 38. An actuator moves the upper die portion 110 into its open position.

The fibers are attenuated from the bushing 10 and over the size applicator 12. After passing around a gathering shoe 14, the strand 22 is inserted in the longitudinal channel 162 of the lower nozzle portion 142.

The actuator moves the upper die portion 110 to its closed position adjacent the lower die portion 112 and the die 100 is sealed. Resin is supplied from the extruder 38 to the die 100. The resin flows from the extruder 38 into the flow chambers, through the flow ports, and into the cavities. The resin flow continues along the outer surface of the nozzle in the outer channel.

The rotational speed of the extruder screw is increased to add more resinous material to the die. Initially, during start-up, some of the resin may flow back into the center channel. However, when the strand 22 is pulled through the die 100, the movement of the strand 22 draws the resin toward the exit port 182 of the die 100 and substantially eliminates the back flow of resin.

As the strand is attenuated through the center channel, the resin flow in the outer channel wirecoats the strand and forms a smooth outer surface. The wirecoated strand can be attenuated from the die 100 by any mechanism that can continuously pull the strand, such as a winding device.

In the illustrated embodiment, a cooling apparatus, such as a cooling bath, is positioned between the die 100 and the attenuating mechanism. As the strand is attenuated from the die, it passes through the cooling apparatus to cool and harden the coating material.

The coated strand 24 may be fed to the pelletizer 30 between the drive roll 32 and the pressure roll 34 which rotate at a slow, start-up speed. Initially, the pelletizer 30 pulls the strand 24 without any chopping. The cutter 36 is moved to engage the drive roll 32 and the coated strand 24 is cut into discrete segments. The pulling speed of the pelletizer 30 is increased and the cut segments are collected when a desired glass weight percent in the range of 10 to 70% by weight in the coated, composite product is achieved.

The adjustment screws may be adjusted to control the flows to the die to achieve an even coating of the strand. If the strand 22 breaks during the wirecoating process, the upper die portion 110 is moved to its open position and the above process is repeated.

In operation, the strand is drawn through the die 100 at a line speed generally in the range of approximately 100 to 2,000 ft/min. (30 to 610 m/min.), and preferably in the range of approximately 300 to 1,000 ft/min. (90 to 305 m/min.).

Figure 15:
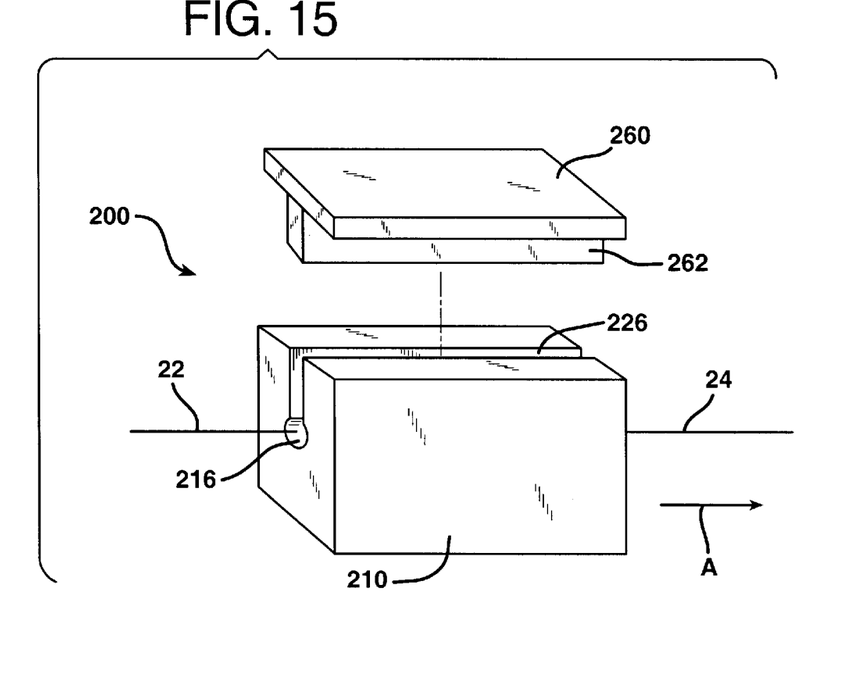
FIG. 15 is an exploded schematic perspective view of an alternative embodiment of a die embodying the principles of the invention.

An alternative embodiment of a die embodying the principles of the invention is illustrated in FIGS. 14–23. As shown in FIG. 15, the die 200 includes a body 210 and a cover 260 that are coupleable to the body 210. The cover 260 is moveable between an open position in which the cover 260 is spaced from the body 210 and a closed position in which the cover 260 is positioned adjacent the body 210.

The body 210 includes a center channel 216 through which strand 22 is attenuated along the direction of arrow "A". In the illustrated embodiment, the body includes a slot 226 that extends from an exterior surface of the body 210 to the center channel 216. The strand 22 is threaded through the slot 226 and into the center channel 216.

The cover 260 includes an extension 262, which is sized to engage the slot 226 when the cover 260 is positioned adjacent the body 210. Preferably, the extension 262 is substantially planar member that is coupled to the cover 260.

In the illustrated embodiment, the cover 260 is a substantially planar plate with a length and width substantially equal to the length and width of the body 210. As appreciated by the artisan, once the strand 22 is thread into the die 200, the cover 260 is positioned adjacent to the body 210 and the extension 262 seals the slot 226.

Figure 16:
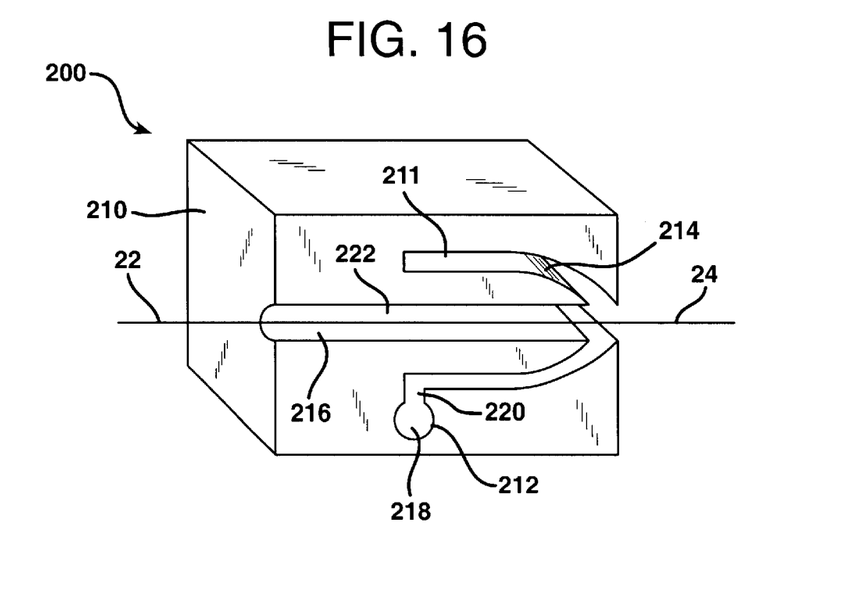
FIGS. 16 and 17 are schematic cross-sectional perspective views of the die of FIG. 15 in its open and closed positions, respectively.

The body 210 includes an outer channel 214 as shown in FIG. 16. The outer channel 214 intersects the center channel 216 at a downstream end of the die 200.

In the preferred embodiment, the die 200 includes an inner wall or partition 222 which is positioned between the center channel 216 and the outer channel 214. The wall may be movable relative to the die 200 to enable replacement and/or adjustment of the wall. In the preferred embodiment, the outer channel 214 extends circumferentially around the center channel 216.

The die 200 receives a resin supply from the extruder 38. The resin supply enters a resin inlet and is directed through the outer channel 214 to the downstream end of the die. The resin forms a sheath around the strand 22 as it is attenuated through the die 200.

An exemplary embodiment of a die embodying the principles of the invention is now described with reference to FIGS. 18 and 19.

In the illustrated embodiment, the die 200 includes a body 210 and a cover 260. Body 210 has an internal cavity 211 that includes outer channel 214. The cavity includes an inner surface and an outlet. In the illustrated embodiment, the body 210 includes a hollow partition or nozzle 230 which separates the outer and center channels 214, 216. Preferably, the nozzle is disposed concentrically within the cavity 211 of the body 210.

The center channel 216 is defined by an inner surface of the nozzle 230. The outer surface 238 of the nozzle 230 has a diameter that is slightly less than the diameter of the cavity. The annular space between the nozzle outer surface 238 and the cavity inner wall defines the outer channel 214.

The resin flows through the outer channel 214 and along the outer surface 238 of the nozzle to a coating region 270 proximate to the exit port 272 of the die 200. The resin forms a thin film which coats the strand 22 as it passes through the coating region 270.

The body 210 includes a system for supplying resin from the extruder to the outer channel. The system includes a supply channel 218 and a flow port 220. The supply channel is in fluidic communication with the outlet of the extruder 38 and the flow port 220. Accordingly, the resin supply flows from the extruder 38 through the supply channel and flow port into the body cavity.

In the illustrated embodiment, the longitudinal axis of the cavity is oriented perpendicularly to the longitudinal axes of the supply channel and the flow port. However, the artisan will appreciate that the cavity, supply channel, and flow port can be oriented in variety of arrangements.

The die 200 includes a resin flow adjuster (not shown) by which the flow of resin in the die may be controlled. Resin flow adjuster is similar to the flow adjuster described above with respect to the die of FIGS. 1–13.

Turning to a more detailed description of the nozzle, an exemplary embodiment of a nozzle is illustrated in FIGS. 18–19 and 22–23.

Figure 19:
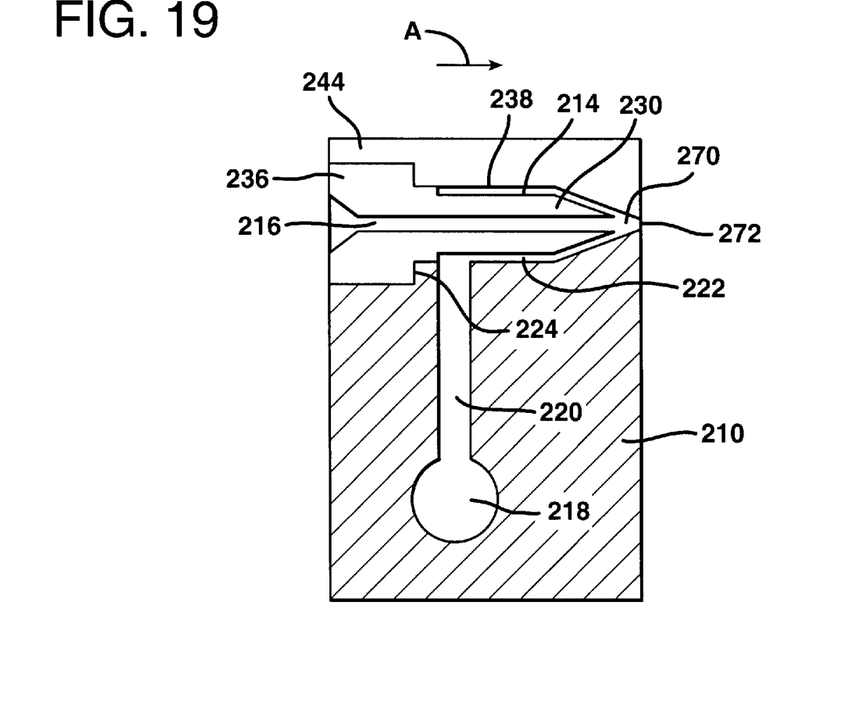
FIG. 19 is a cross-sectional side view of the die of FIG. 18 taken along the lines "19—19".

The nozzle 230 is disposed in the cavity 211 of body 210 as shown in FIG. 19. The cavity 211 includes a substantially cylindrical portion and a tapered portion. The tapered portion directs the resin in the outer channel 214 toward the strand. In the illustrated embodiment, the nozzle 230 includes a cylindrical portion 232 and a conical tip 234 at end 240. The conical tip 234 has a slope substantially similar to that of the cavity tapered portion.

The nozzle 230 also includes a flange 236 at the other end. The diameter of the flange 236 is larger than the corresponding diameter of the cavity. Accordingly, the flange 236 engages a seat 224 formed in the body 210. The extent to which the nozzle 230 is inserted into the cavity is limited by the seat 224.

The length of the nozzle 230 is slightly less than the length of the cavity 211. The area beyond the end of the nozzle 230 is referred to as the coating region 270. The molten material that flows through the outer channel 214 is applied to the strand after it passes through the exit port 252 of the nozzle 230.

In the illustrated embodiment, the inlet of the center channel 216 includes a tapered inlet surface 248. Inlet surface 248 is tapered at an angle to reduce the damage to the strand as it is attenuated through the die 200.

The nozzle 230 also includes a tapered inner surface 250 with the purpose of reducing the friction and damage to the strands as it is passing through the nozzle.

Figure 18:
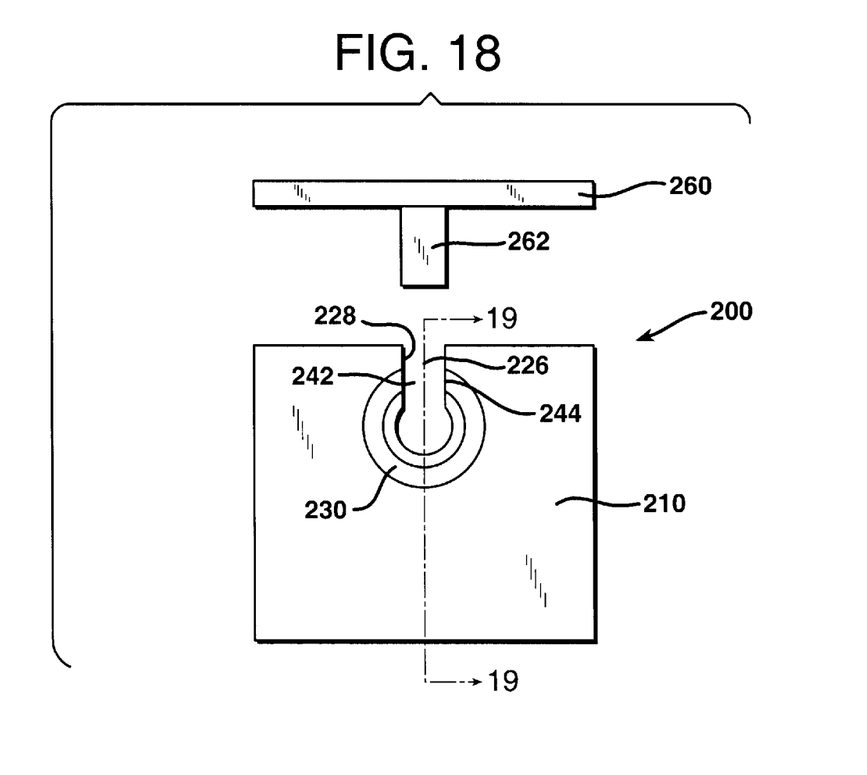
FIG. 18 is an exploded end view of the die of FIG. 15.

As previously discussed, the die body 210 includes a slot 226, which is defined by side walls 228 as shown in FIG. 18. In the illustrated embodiment, the nozzle 230 also includes a slot 242 that is formed by side walls 244. Preferably, slots 226, 242 have substantially the same width, which is in the range of approximately 0.008 to 0.06 in. (0.02 to 0.15 cm). Slots 226, 242 are also preferably in alignment with each other to enhance the threading of a strand into the center channel 216.

Figure 17:
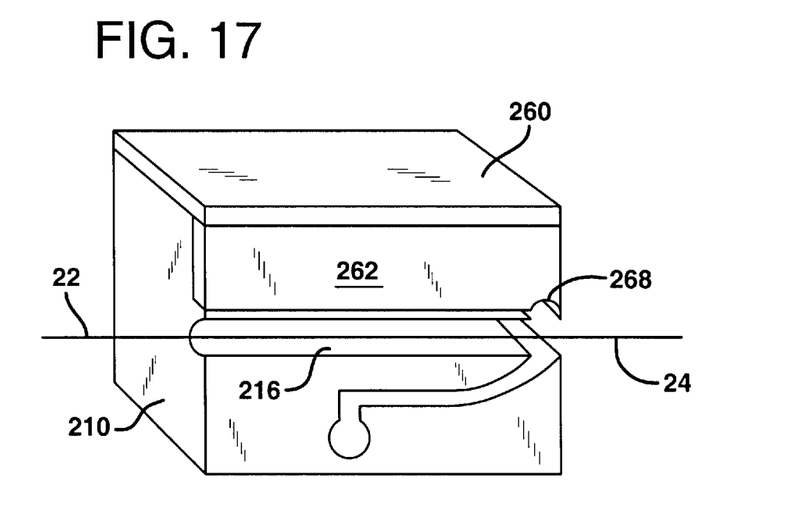
Figure 20:
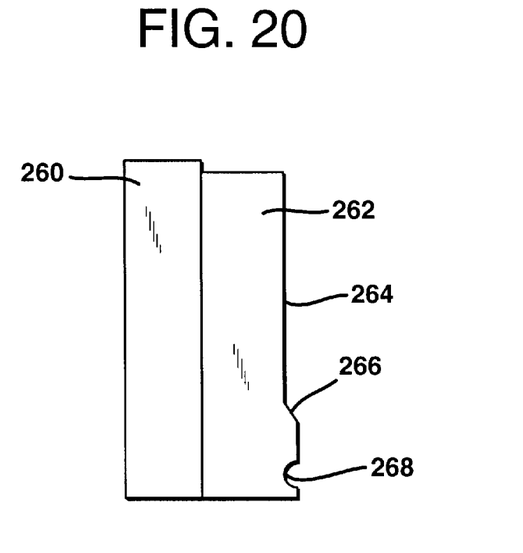
FIG. 20 is a side view of the cover of FIG. 18.
Figure 21:
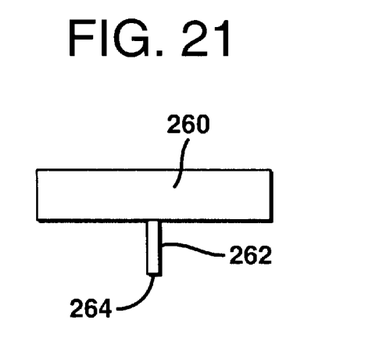
FIG. 21 is an end view of the cover of FIG. 18.
Figure 22:
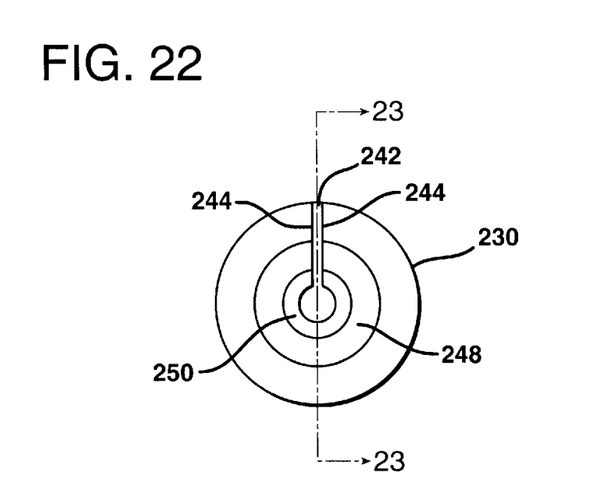
FIG. 22 is an end view of the nozzle of the die of FIG. 15.
Figure 23:
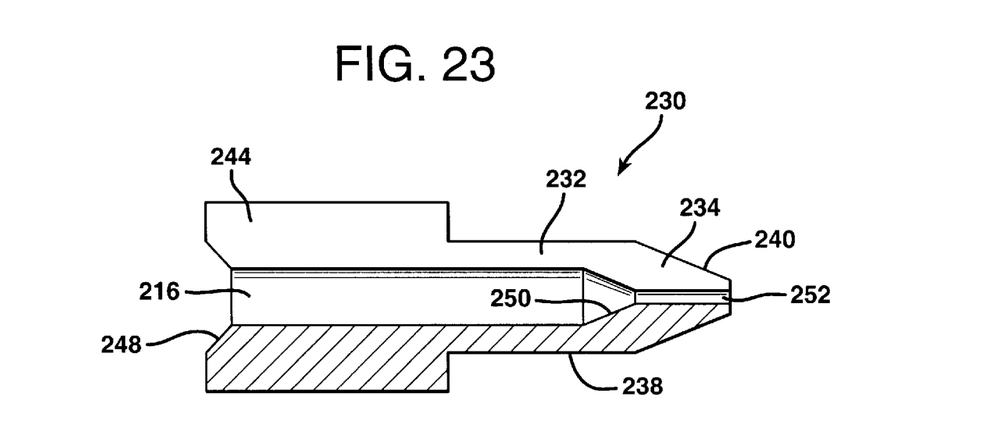
FIG. 23 is a cross-sectional side view of the nozzle of FIG. 22 taken along the lines "23—23".

A cover embodying the principles of the invention is shown in FIGS. 17 and 20–21. The cover 260 includes an extension 262 that is coupled to the cover 262. As discussed above, the extension 262 is sized to engage the slots 226, 242.

In the illustrated embodiment, the length of the extension 262 is slightly less than the length of the cover 260 as shown in FIG. 20. The shorter length of the extension 262 eliminates interference between the strand and the extension 262 at the inlet of the die 200.

The extension 262 includes an edge 264. The edge 264 includes a tapered portion 266 and a recess 268. The tapered portion 266 is tapered with substantially the same slope as the conical tip 234 of the nozzle 230. The recess 268 is hemi-spherical in cross-section and located proximate to the coating region 270.

As illustrated in FIG. 17, the extension 262 blocks the outer channel 214 above the center channel 216, thereby prohibiting the resin from flowing completely circumferentially around the nozzle. The recess 268 allows the resin from the different sides of the outer channel 214 to mix in the coating region 270 and form a complete coating sheath on the strand.

The die components and cover are preferably made from stainless steel or other corrosion and temperature resistant material.

Turning to the operation of the die of FIGS. 14–23, the die body 210 is coupled to the outlet of an extruder 38 which supplies molten resin to the die 200. Initially, the die 200 is in its open position with the cover 260 removed from the die body 210. An uncoated strand 22 is pulled from a package 40 and threaded through a strand guide 44. The strand 22 is then thread through the slots 226 and 242 in the body 210 and the nozzle 230, respectively. The strand 22 is positioned in the center channel 216 and coupled to a winder 46 for collection.

The cover 260 is placed on the die body 210 by a hydraulic or pneumatic actuator (not shown) to seal the slots 226, 242. The extruder and the winder are started simultaneously to begin the coating operation.

During operation, the molten material, being pushed by the back pressure supplied by the extruder, enters the die body 210. The material flows through the supply channel 218 and flow port 220 to the outer channel 214. The material then flows through the outer channel 214 to the coating region 270.

The flow of the molten material along the outer surface of the nozzle is split along the top of the nozzle 230 by the extension 262. The recess 268 in the extension 262 permits the two flows to mix in the coating region 270. The mixing of the flows enhances the formation of a complete coating sheath on the strand.

In the illustrated embodiment, the dies include heating strips on the die body portions or heating cartridges in the die bodies to maintain the resin in the die in a molten state. The heating strips (not shown) are secured to the external surfaces of the dies. The heating strips are preferably electrical resistance heaters which heat the die to an operating temperature of approximately 300–350° F. (180 to 190° C.). The die operating temperature depends on the melting point of the particular resinous material. One or more thermocouples (not shown) may be utilized to monitor and regulate the temperature of the die as appreciated by the artisan.

It is to be understood that the artisan will appreciate how to manufacture the die. For example, the channels, ports, and cavities in the die may be bored by any appropriate tool.

The strand for use in the present invention may be selected from a wide variety of materials. The preferred material for the strand is Type 30 glass and glass rovings.

Suitable materials useful for wirecoating the strand by using the high pressure die system are thermoplastic resins including Polyamide (PA), Polystyrene (PS), Polyvinyl Chloride (PVC), Polypropylene (PP), Low density Polyethylene (LDPE), High density Polyethylene (HDPE), and other. For the low pressure die system, suitable materials are thermoset resins including epoxy, Polyester (PE), and others.

The artisan will also appreciate that there are many possible variations on the particular embodiments described above that would be consistent with the principles of the invention.

It is to be appreciated that the coating system may include several dies in parallel to coat a plurality of strands simultaneously. Alternatively, each die may include a plurality of nozzles to coat a plurality of strands.

The resin flow adjuster is not limited to the arrangement of an adjustment screw in a cavity. Any type of flow adjuster may be employed. For example, a variable orifice, damper or check-valve may be used.

The slots in the die body and the nozzle may vary in diameter and may be tapered inwardly toward the center of the die body.

The cover and the extension in the sealable slot die may be integrally formed.

The cross-section of the extension may vary as long as the extension seals the slot(s) in the die.

The cover may be any shape that allows it to be placed proximate to the die body.

The slots in the nozzle and die body may be positioned on a side or lower surface of the die body.

The source of resin may be supplied from above the center channel.

What is claimed is:

1. A die for coating a continuous strand with a resinous material, the die comprising:
   a first body portion having a passage therethrough, said passage having an outlet; and
   a second body portion having a passage therethrough, said passage having an outlet,
      wherein said first body portion is pivotally moveable relative to said second body portion between
      an open position in which the strand is inserted into the die and
      a closed position in which a first face on the first body portion and a second face on the second body portion are brought together to form a substantially fluid-tight seal and said outlets are fluidically coupled,
   wherein the first and second body portions are coupled to a support, the first body portion being pivotally coupled to the support so that the first body portion is moveable between a first position proximate the second body portion and a second position spaced from said second body portion, wherein all portions of the first body portion have an increased separation distance from the second body portion when the first body portion is in the second position, and
   the resinous material can be supplied to the die to coat the continuous strand.

2. The die of claim 1, wherein
   each of said first body portion and said second body portion includes
      an inner wall having an outer surface defining one of said passages, and
      said passages are adapted to direct the resinous material to coat the continuous strand.

3. The die of claim 2, further comprising:
   a plate coupled to the first face of the first body portion to seal the first body portion passage to prevent the leakage of resinous material from first body portion.

4. A die for coating a continuous strand with a resinous material comprising:
   a body including a first portion and a second portion; and
   a support, wherein said first and second body portions are separately coupled to said support, and said first body portion is pivotally coupled to said support and is moveable relative to said second body portion between an open position in which the strand is inserted into the die and a closed position in which said first and second body portions are fluidically coupled,
   wherein said die includes first and second conduits coupling said first and second body portions to said support, respectively, and said first and second conduits are adapted to supply the resinous material from said support to said first and second body portions simultaneously.

5. The die of claim 4, wherein said first body portion includes a flow channel that is adapted to direct the resinous material to coat the strand.

6. The die of claim 5, wherein said die further comprises:
   a plate coupled to said first body portion to seal said flow channel.

7. An apparatus for coating a continuous strand with a coating composition, the apparatus comprising a support body, a die, a plate, an actuator, and a plurality of conduits, wherein:
   the support body comprises a port for receiving the coating composition and directing the coating composition to the conduits;
   the die comprises
      a first body portion, the first body portion comprising a first longitudinal channel formed on and extending completely across a first face, a first passage formed through the first body portion to establish a fluid connection between the first channel and a first opening on a second face and a recess provided on the first face for receiving the plate, the first body portion maintained in a substantially fixed position relative to the support body;

a second body portion moveable relative to the first body portion, the second body portion comprising a second longitudinal channel formed on and extending completely across a third face and a second passage formed through the second body portion to establish a fluid connection between the second channel and a second opening on a fourth face;

the plurality of conduits comprise a first conduit arranged and configured to extend between the support body and the first body portion and provide both a primary mechanical support for the first body portion, and a fluidic connection whereby a portion of the coating composition exiting the support body is directed through the first conduit, through the first opening and into the first passage and a second conduit arranged and configured to extend between the support body and the second body portion and provide both a primary mechanical support for the second body portion and a fluidic connection between the support body and the second body portion whereby a portion of the coating composition exiting the support body is directed through the second conduit, through the second opening and into the second passage; and the actuator being selectively operable to move the second body portion and the second conduit between a first portion and a second position, wherein in the first position the third face is in contact with the first face and the plate, the first and second longitudinal channels cooperating to form a duct through which the continuous strand may pass, the duct having an inlet for receiving the continuous strand and an outlet for removing the continuous strand coated with a coating composition and the contact between the third face and the first face and the plate being sufficient to confine substantially all of the coating composition entering the duct through the first and second passages to the duct, and wherein in the second position the second body portion is separated from the first body portion, the second body portion moving along a generally arcuate path about an axis extending in a generally longitudinal direction through the support body and a radius approximately equal to a second conduit length.

8. An apparatus for coating a continuous strand with a coating composition according to claim 7, wherein the actuator is selected from a group consisting of pneumatic, and hydraulic actuators.

9. An apparatus for coating a continuous strand with a coating composition according to claim 7, wherein the first body portion further comprises a first flow adjuster, the first flow adjuster being operable to control the flow of the coating composition through the first passage.

10. An apparatus for coating a continuous strand with a coating composition according to claim 9, wherein the second body portion further comprises a second flow adjuster, the second flow adjuster being operable to control the flow of the coating composition through the first passage.

11. An apparatus for coating a continuous strand with a coating composition according to claim 10, wherein the first flow adjuster and the second flow adjuster comprise threaded members having forward portions that can be selectively advanced or withdrawn to provide independent control of the flow of the coating composition through the first and second passages.

\* \* \* \* \*